(12) United States Patent
Saleh

(10) Patent No.: US 6,587,241 B1
(45) Date of Patent: Jul. 1, 2003

(54) OPTICAL PROTECTION METHODS, SYSTEMS, AND APPARATUSES

(75) Inventor: Adel A. M. Saleh, Holmdel, NJ (US)

(73) Assignee: Corvis Corporation, Columbia, MD (US)

( * ) Notice: Subject to any disclaimer, the term of this patent is extended or adjusted under 35 U.S.C. 154(b) by 0 days.

(21) Appl. No.: 09/378,311

(22) Filed: Aug. 20, 1999

(51) Int. Cl.$^7$ .................................. H04J 14/02
(52) U.S. Cl. ................ 359/134; 359/124; 359/174
(58) Field of Search ................ 359/124, 125, 359/127, 133, 174, 175, 179, 134; 385/24, 37

(56) References Cited

U.S. PATENT DOCUMENTS

| | | | |
|---|---|---|---|
| 4,886,334 A | 12/1989 | Aoki | |
| 4,945,531 A | 7/1990 | Suzuki | |
| 5,111,334 A | 5/1992 | Heidemann | |
| 5,331,449 A | 7/1994 | Huber et al. | |
| 5,392,154 A | 2/1995 | Chang et al. | |
| 5,452,116 A | 9/1995 | Kirkby et al. | |
| 5,801,858 A | 9/1998 | Roberts et al. | |
| 5,986,800 A | 11/1999 | Kosaka | |
| 6,008,934 A | 12/1999 | Fatehi et al. | |
| 6,084,704 A | * | 7/2000 | Button et al. ............ 359/139 |
| 6,215,581 B1 | * | 4/2001 | Yadlowsky ............ 359/174 |

FOREIGN PATENT DOCUMENTS

| | | |
|---|---|---|
| EP | 0242 802 A2 | 10/1987 |
| EP | 0305 995 B1 | 3/1989 |
| EP | 0617 527 B1 | 9/1994 |
| EP | 0959 577 A2 | 11/1999 |
| EP | 0994 595 A2 | 4/2000 |
| JP | 01115230 A | 5/1989 |
| JP | 3269522 | 12/1991 |
| WO | WO 97/50203 | 12/1997 |

OTHER PUBLICATIONS

Dany, B., et al., "Distributed In-Line Optical Regeneration for Massive WDW Transmission", Electron. Lett., Sep. $2^{nd}$ 1999, vol. 35, No. 18.

Dany, B., et al., "Assessment of 16x40GBIT/S Dispersion–Managed Transoceanic Systems with High Spectral Efficiency", Electron Lett., Sep. $2^{nd}$ 1999, vol. 35, No. 18.

Massicott, J.F., et al. "Low Noise Operation of ER 3+ Doped Silica Fibre Amplifier Around p.m.", Electron, Lett., Sep. $24^{th}$ 1992, vol. 28, No. 20.

Eskildsen, L., et al., "Self–Regulating WDM Amplifier Module for Scalable Lightwave Networks", IEEE Photonics Technology Letters, vol. 6, No. 11, Nov. 1994, pp. 1321–1323.

Mestdagh, Denis, J.G., "Fundamentals of Multiaccess Optical Fiber Networks", Published: Artech House, Inc., Norwood, MA, 1995, pp. 175, 193–211.

Bhagavath, Vijay, K., et al., Reliability Evaluation and Protection Schemes for Dense WDM Network Architectures, Proceedings of the International Conference on Communications, US, New York, IEEE, vol. 1, Jun. 14, 1992, pp. 174–178.

* cited by examiner

Primary Examiner—John Tweel

(57) ABSTRACT

Optical systems of the present invention include at least one optical amplifier configured to provide partitioned amplification over the range of signal wavelengths carrying information between optical signal processing nodes. The optical amplifier is configured to partition the gain provided to a plurality of wavelength groups such that the gain in a wavelength group is only partly interdependent on, or independent of, the gain in the other wavelength groups. The optical system is further configured to transmit information using working wavelengths and one or more protection wavelength in different wavelength groups. The information can be transmitted simultaneously to provide a single fiber 1+N type protection. Similarly, the information can be switched from the first wavelength to the second wavelength upon a failure to provide single fiber M:N type protection. This protection scheme can be used in both uni- and bi-directional systems to provide protection for information being transmitted on one or more fibers or fiber paths.

26 Claims, 7 Drawing Sheets

OPTICAL PROTECTION METHODS, SYSTEMS, AND APPARATUSES

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention is directed generally to optical transmission systems. More particularly, the invention relates to optical transmission systems including protection capability for use it optical communication systems.

Communications transport systems are used to transport information over a substantial portion of the world. This extensive communication access requires enormous amounts of equipment to provide the necessary infrastructure for the systems. In addition, much of the equipment and almost all of the transport media is remotely located and necessarily exposed to the environment.

It view of the necessary exposure of transmission systems to uncontrolled environments, it is not uncommon for failures to occur in links along a transmission path. However, it communication systems are to be effective, it is necessary to have a high degree of reliability in the system. Thus, communication systems must provide for protection of the information being transmitted through the systems, as well as for restoration of failed links in the system.

The reliability of service provided by a transmission system is inversely proportional to the frequency of failures in the transmission system. One of the most common failures in fiber optic transmission systems is a fiber break. When a fiber break or other failure occurs in a transmission link, the traffic intended to pass through the link must be rerouted through another path until the link is restored.

Another common source of failures in optical transmission systems is an equipment failure. The amount of traffic that is lost upon an equipment failure depends upon the particular piece of failed equipment in the system. For example, in most, if not all, currently available fiber optic transport systems, a line amplifier failure will result in a complete loss of traffic traveling through an optical link containing the failed line amplifier. Whereas, a transmitter or a receiver failure will generally result only in the loss of the wavelengths associated with the failed transmitter or receiver. When an amplifier fails or fiber cut occurs, traffic must be rerouted through a new path. When a transmitter or receiver fails, the traffic must be transferred to a different transmitter and/or receiver using the same or a different channel and/or transmission path.

Despite the persistent hazards of uncontrolled exposure to environmental conditions and inevitable equipment failures, it is imperative that communications service providers supply high quality service. Therefore, service providers have developed protection schemes to provide automatic traffic restoration upon a transmission link failure and have required redundant equipment systems to decrease the effective failure rate of tie link.

Protection schemes are generally categorized based on whether it is a channel or a path being protected. In channel protection schemes, if information is transmitted on both a working channel and a protection channel, the schemes are referred to as providing one plus one ("1+1") protection. Conversely, if information is switched from a working channel to protection channel or working path to a protection path only when a failure occurs, the schemes are referred to as one for one ("1:1") protection schemes. More generally, M protection channels or paths can be shared between N working channels or paths, which is generally designated as M:N protection. Similarly, M protection channels can carry the same information as the working channel to provide 1+M protection.

In "1+1" schemes, the information is sent along to two different paths from an origin node to a destination node. At the destination node, one of the two signals is used and the other is discarded. Normally, the working channel is used and the protection channel is discarded, but when a failure in the working channel transmission occurs, the protection channel is used. In "1:1" schemes, either the working channel is switched to a protection path or the information is switched to a protection channel on the protection path.

Channel protection schemes can be implemented along with various multiple fiber path protection schemes. Path protection can be performed if at least one redundant path is available between the origin and destination nodes. For a path to be fully protected, there must not be any common links in the redundant paths.

While there is no inherent requirement that the same fiber route be used to transmit information in both directions (East-West & West-East, etc.), many system topologies are configured employing this requirement and protected as rings. Ring configurations and protection schemes are based on using the same fiber route for either the working or protection traffic in each direction between two nodes, which allows the information being transmitted to be fully contained within the ring. Most path protection schemes are generally analogous to two classes of ring protection schemes, except the same fiber route limitation may not be imposed. The first class of protection schemes is referred to as Bi-directional Line-Switched Ring ("BLSR") in SONET, or Multiplex section-Shared Protection Ring ("MS-SPRing") in SDH. The second class is known as Unidirectional Path-Switched Ring ("UPSR") in SONET, or Dedicated Protection Ring ("DPRing") in SDH. BLSR and UPSR schemes can be implemented using two or more fibers interconnecting nodes, which either electrically or optically switch traffic between the working and protection paths established by fiber rings.

In BLSR schemes, working channels for each direction connection two nodes are transmitted on different rings in the same working path. Protection for the working channels is provided using one or more different rings in a common protection path. In UPSR schemes, different working paths for each direction are provided on the same ring and the protection paths are provided on other rings. The protection path in one direction is common with the working path in the other direction.

In the event of a failure of the working path, a destination node for the traffic will switch to the protection path to receive the traffic in both 1+1 and 1:1 schemes. In 1:1 schemes, an origin node for the traffic and/or other nodes between the origin and destination node will also switch the traffic to the protection path to route traffic around the failure.

As the demand for transmission capacity continues to grow, there is an increasing need to efficiently use the available transmission capacity and protect the information being transported through the systems. However, some systems do not, or will not, have sufficient fiber or capacity to provide traditional multiple fiber protection schemes.

In addition, the increased amount of traffic being carried on each fiber places increased importance on the ability to effectively protect the information, because each failure results in higher revenue losses for service providers. Accordingly, there is a need for optical transmission systems and protection schemes that provide effective protection with increasing wavelength efficiencies for use in long distance communication systems.

BRIEF SUMMARY OF THE INVENTION

The present invention addresses the need for higher reliability optical transmission systems, apparatuses, and methods. Optical systems of the present invention include at least one optical amplifier configured to provide partitioned amplification, or gain, over the range of signal wavelengths carrying information between optical signal processing nodes. The optical amplifier is configured to partition the gain provided to a plurality of wavelength groups such that the gain imparted to a wavelength group is only partly interdependent on, or independent of, the gain imparted to other wavelength groups.

The optical system can thus be configured to transmit information using working wavelengths, or channels, and one or more corresponding protection wavelengths, or channels, in different wavelength groups in the same fiber. The information can be transmitted simultaneously to provide a single fiber 1+N type protection. Similarly, the information can be switched from the first wavelength to the second wavelength upon a failure to provide single fiber M:N type protection. This protection scheme can be used in both uni- and bi-directional optical transmission systems to provide single fiber protection in the event of various transmitter, receiver, and amplifier failures.

The optical amplifiers generally include amplifying media and power supplies that provide gain in different wavelength groups to produce optical amplifier gain partitioning. Therefore, if an amplifier power supply fails for one wavelength group, the remaining amplifier power supplies continue to function and provide optical amplification for the remaining, or surviving, wavelength groups.

The optical amplifiers can include a single stage or multiple stages that provide independent or partly interdependent gain to the wavelength groups. For example, various embodiments include distributed and/or concentrated Raman amplifiers employing a plurality of pump wavelengths configured to provide partitioned gain in one or more serial amplifier stages. The different Raman stages can provide gain for some or all of the wavelength groups in similar or varying gain profiles and amplification levels. Similarly, doped fiber amplifiers providing partitioned gain can be used in one or more stages alone or in combination with Raman fiber amplifiers. The optical amplifier stages can also include stages having the same or different optical amplifier designs.

The protection scheme of the present invention increases the reliability of both uni-directional and bi-directional optical systems by reducing the number of line amplifier failure scenarios resulting in an optical link failure that requires the rerouting of traffic. This reduction in the number of optical link failures is particularly beneficial in optical fiber transmission systems that do not provide multiple independent paths between nodes. In those systems, the present invention provides protection for traffic being transmitted either uni- or bi-directionally on a single fiber, in addition to any protection that may be available using multiple fiber protection schemes it the same or different paths.

Accordingly, the present invention addresses the aforementioned concerns by providing optical systems apparatuses, and methods having increased reliability. These advantages and others will become apparent from the following detailed description.

BRIEF DESCRIPTION OF THE DRAWINGS

Embodiments of the present invention will now be described, by way of example only, with reference to the accompanying drawings for the purpose of illustrating embodiments only and not for purposes of limiting the same; wherein like members bear like reference numerals and.

DESCRIPTION OF THE INVENTION

Figure 1:
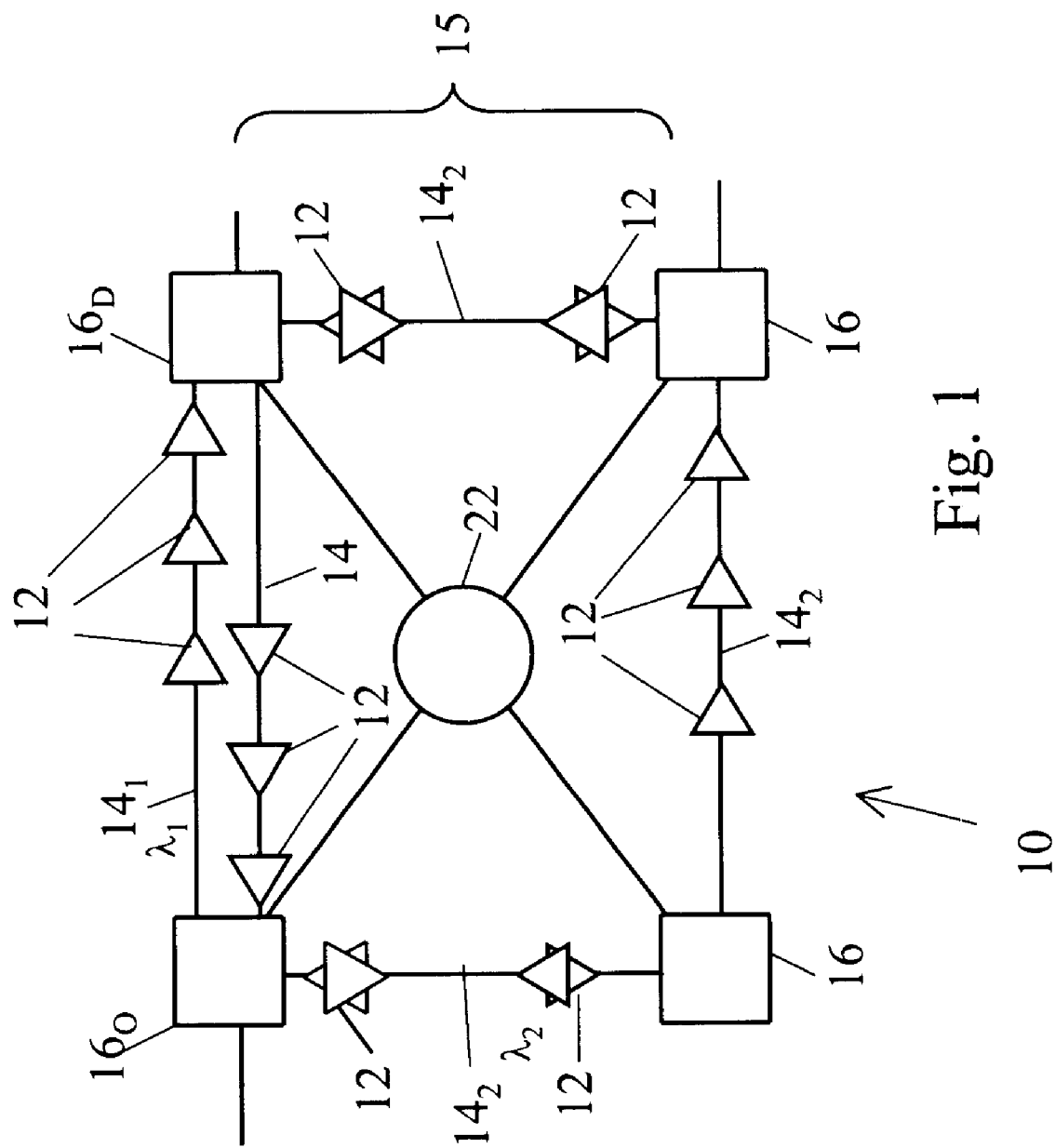
FIGS. 1–5 show optical system embodiments.

Optical systems 10 of the present invention include one or more optical amplifiers 12 disposed along an optical transmission fiber, or other waveguide, 14 forming an optical link 15 between optical processing nodes 16. The optical amplifiers 12 are configured to provide partitioned optical amplification of the optical signals passing through the link is between the nodes 16 to overcome optical signal attenuation in the fiber 14, as will be further described.

One or more transmitters 18 can be included in the nodes 16 and configured to transmit information via the optical signals in one or more information carrying signal wavelengths, or signal channels, $\lambda_i$ to one or more optical receivers 20 in other nodes 16. The optical system 10 can be controlled by a network management system 22 and configured in multi-dimensional networks (FIG. 1) or in one or more interconnected point to point links (FIG. 2) employing the same or different wavelengths in each link 15. Furthermore, the system 10 can be configured to provide uni-directional or bi-directional transmission in each fiber 14.

The transmitters 18 can transmit the information using directly or externally modulated optical carrier sources or optical upconverters. The receivers 20 can include both direct and coherent detection receivers. For example, N transmitters 18 can be used to transmit M different signal wavelengths to J different receivers 20.

In various embodiments, one or more of the transmitters 18 and receivers 20 can be wavelength tunable to provide wavelength allocation flexibility in the optical system 10. The transmitters is and receivers 20 can be also connected to interfacial devices 24, such as electrical and optical cross-connect switches, IP routers, etc., to provide interface flexibility within, and at the periphery of, the system 10. The interfacial devices 24 can be configured to receive, convert, and provide information in one or more various protocols, encoding schemes, and bit rates to the transmitters 18, and perform the converse function for the receivers 20. The interfacial devices 24 also can be used to provide protection switching in various nodes 16 depending upon the configuration.

The optical processing nodes 16 may also include other optical components, such as one or more add/drop devices and optical switches/routers/cross-connects optically interconnecting the transmitters 18 and receivers 20. For example, broadcast and/or wavelength reusable, add/drop devices, and optical and electrical/digital cross connect switches and routers can be configured via the network management system 22 in various topologies, i.e., rings, mesh, etc. to provide a desired network optical connectivity.

Optical combiners 26 can be provided to combine optical signals from different optical paths onto a common path. Likewise, optical distributors 26 can be provided to distribute optical signals from a common path to a plurality of different optical paths. The optical combiners 26 and distributors 28 can include wavelength selective and non-selective ("passive") fiber and free space devices, as well as polarization sensitive devices. Passive or WDM couplers/splitters, circulators, dichroic devices, prisms, gratings, etc. can be used alone, or in combination with various tunable or fixed, high, low, or band pass or stop, transmissive or reflective filters, such as Bragg gratings, Fabry-Perot devices, dichroic filters, etc. in various configurations of the optical combiners 26 and distributors 28. Furthermore, the combiners 26 and distributors 28 can include one or more serial or parallel stages incorporating various devices to multiplex, demultiplex, and broadcast signal wavelengths $\lambda_i$ in the optical systems 10.

Figure 2:
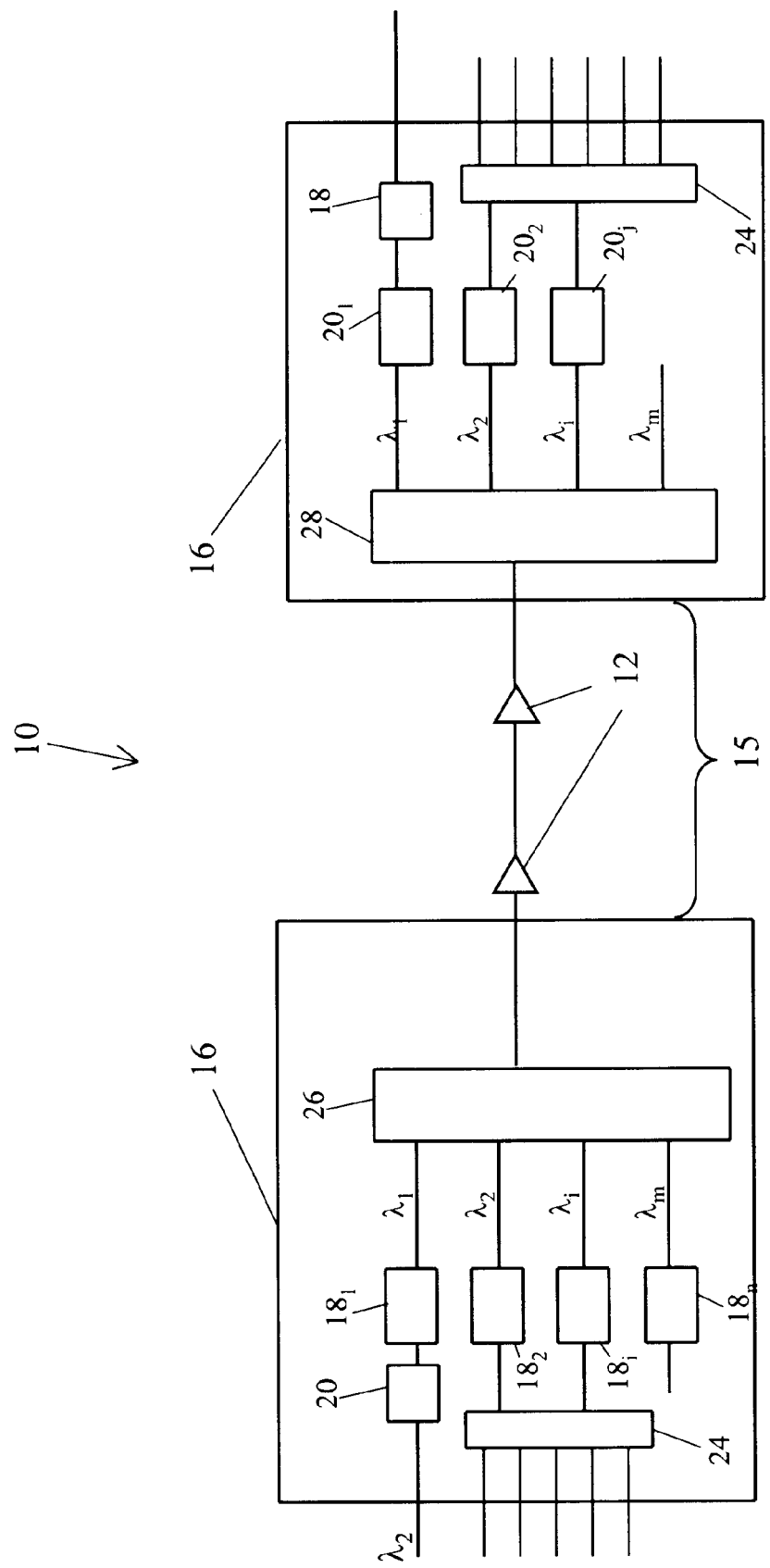
Figure 4:
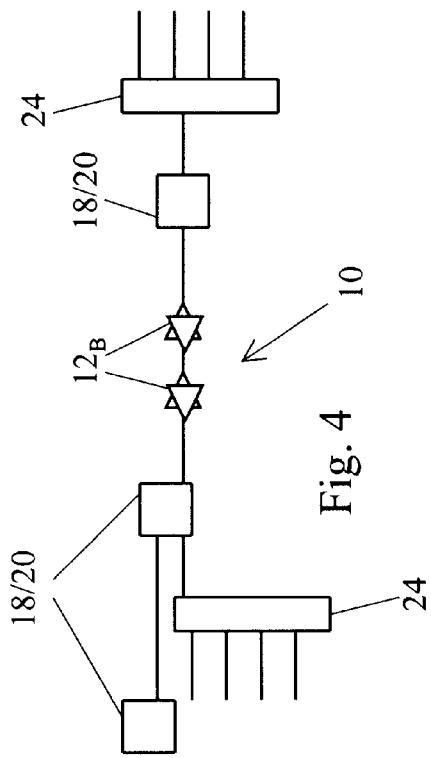
Figure 3:
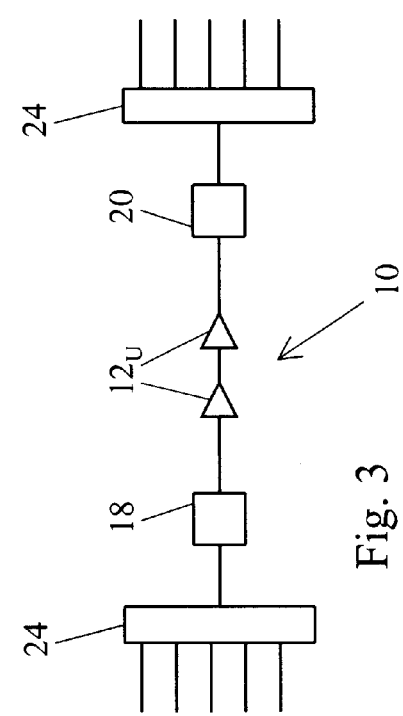
Figure 5:
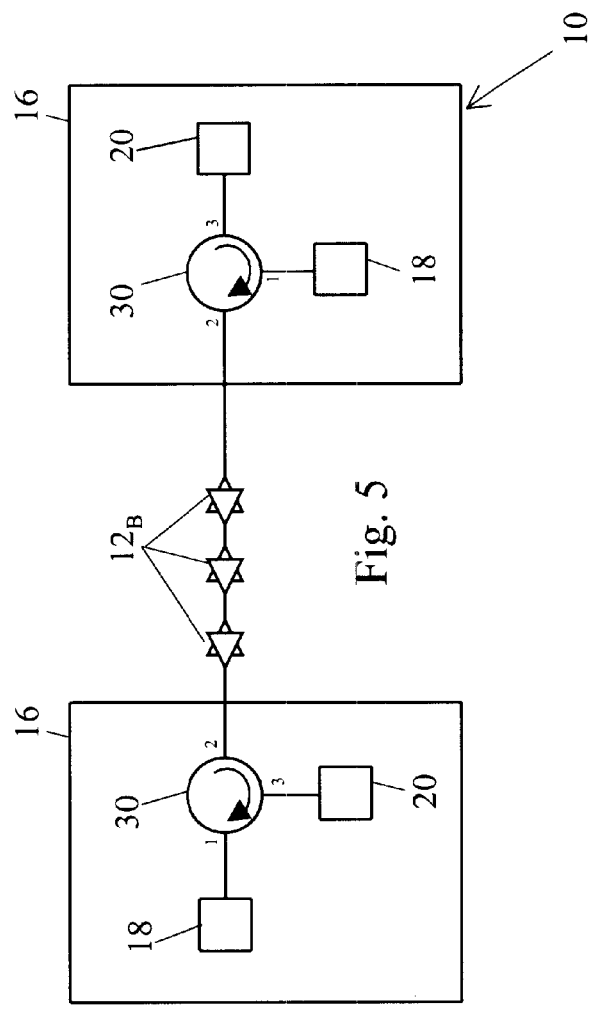

FIGS. 1–5 show exemplary embodiments of uni- and bi-directional optical systems 10 that can be used to transmit one or more signal wavelengths $\lambda_i$ in one or more point-to-point links, as well as in optical networks. As shown in FIGS. 2–4, the transmitters 18 and receivers 20 from different links 15 can be directly interconnected and/or connected via interfacial device 24 to provide regeneration and wavelength conversion within and/or at the periphery of the optical system 10. FIG. 5 shows a bi-directional optical system embodiment in which optical circulators 30 are used to interconnect respective transmitters 10 and receivers 20.

The optical amplifiers 12 in the present invention are configured to provide partitioned optical signal amplification, or "gain", in a plurality of wavelength groups $\lambda G$. The gain provided to signal wavelengths $\lambda_i$ by the amplifier 12 is partitioned by wavelength groups $\lambda G$. Therefore, the gain provided to signal wavelengths $\lambda_i$ in each wavelength group $\lambda G_i$ is only partly interdependent on, or independent of, the gain in one or more other wavelength groups $\lambda G_j$.

In the context of the present invention, the phrase "partly interdependent" is construed to mean that the optical amplifier 12 continues to provide sufficient gain to the signal wavelengths $\lambda_i$ in one or more surviving wavelength groups to reach a subsequent amplifier 12 or processing node 16, despite a partial or complete failure of the optical amplifier 12 in one or more failed wavelength groups. However, the optical signal characteristics of the signal wavelengths in the surviving wavelength groups may be degraded by the failure of a portion of the optical amplifier 12. In contrast, surviving wavelength groups amplified by optical amplifier 12 embodiments that provide independent gain generally would not be degraded, when a partial or complete failure of the optical amplifier 12 occurs in other wavelength groups.

When the gain in the wavelength groups is partly interdependent, the loss of amplification in one or more groups may affect the gain of the other groups. In those embodiments, the system 10 can be configured to continue operation with the affected gain in the surviving groups or adjust the gain in the remaining operative portion of the optical amplifier 12 to reestablish the nominal gain in the surviving groups.

Each wavelength group $\lambda G_i$ may contain one or more signal wavelengths $\lambda_i$ spanning one or more signal wavelength ranges. The signal wavelengths $\lambda_i$ within each wavelength group $\lambda G_i$ can be established in continuous or discontinuous bands of wavelengths as may be appropriate. The assignment of wavelength groups $\lambda G_i$ can be varied depending upon the optical amplifier embodiment as will be further described.

The optical amplifiers 12 generally include amplifying media and power supplies that provide partitioned amplification, or gain, in different wavelength groups. Therefore, if an amplifier power supply fails for one wavelength group, the remaining amplifier power supplies continue to function and provide optical amplification for the remaining, or surviving, wavelength groups.

Figure 6:
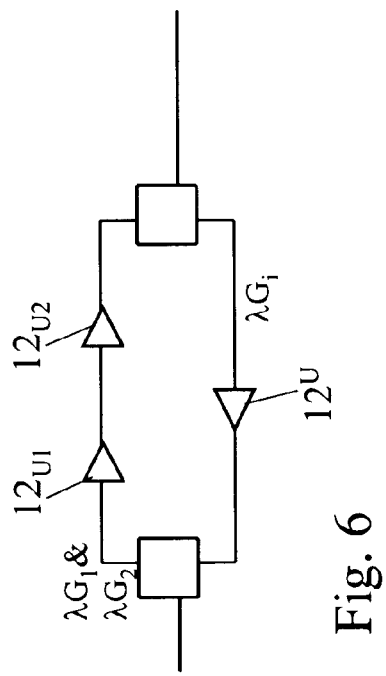

Partitioned gain in the optical amplifier 12 can be provided using various embodiments employing single stage or multiple stage amplifiers (FIG. 6). The optical amplifiers can be provided for uni- or bi-directional amplification of the signal wavelengths $\lambda_i$. In addition, the bi-directional amplifiers $12_B$ can include directional devices 26/28, such as circulators, to provide the signal wavelengths traveling in each direction to different uni-directional amplifiers $12_U$, as further shown in FIG. 6.

Figure 9:
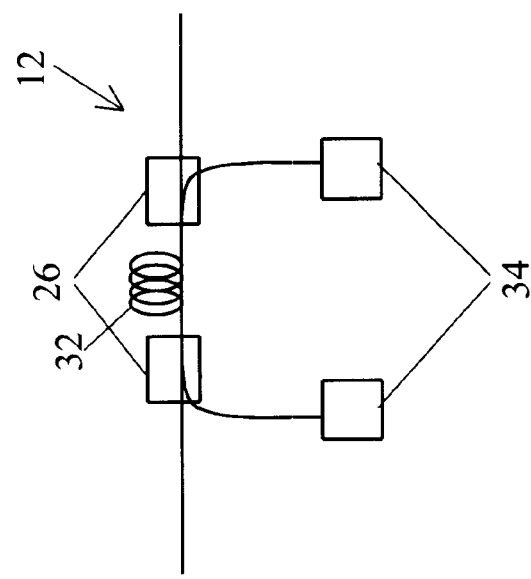
FIGS. 6–13 show various optical amplifier embodiments.
Figure 7:
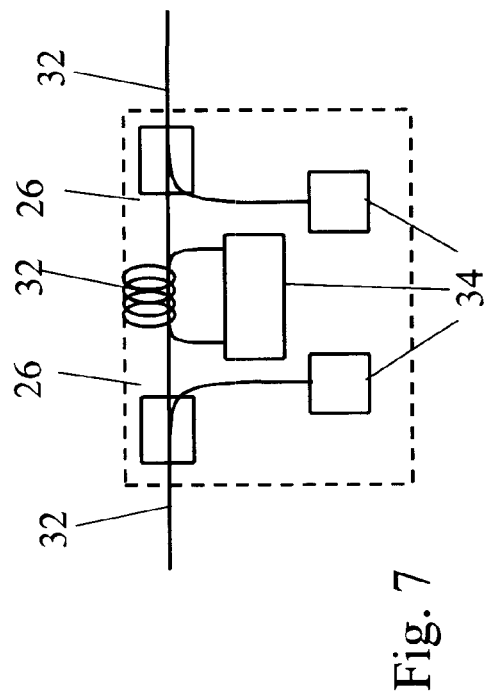
Figure 8C:
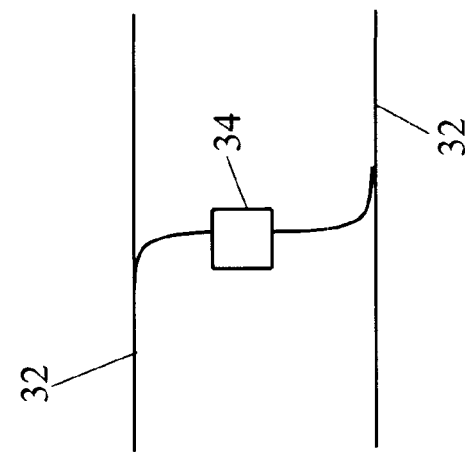
Figure 8A:
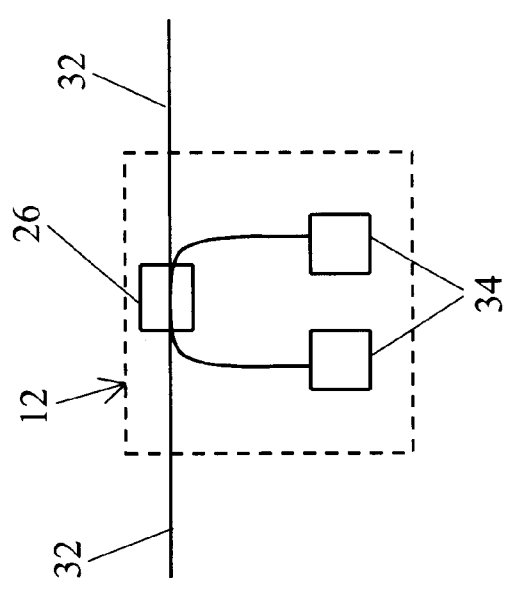
Figure 8B:
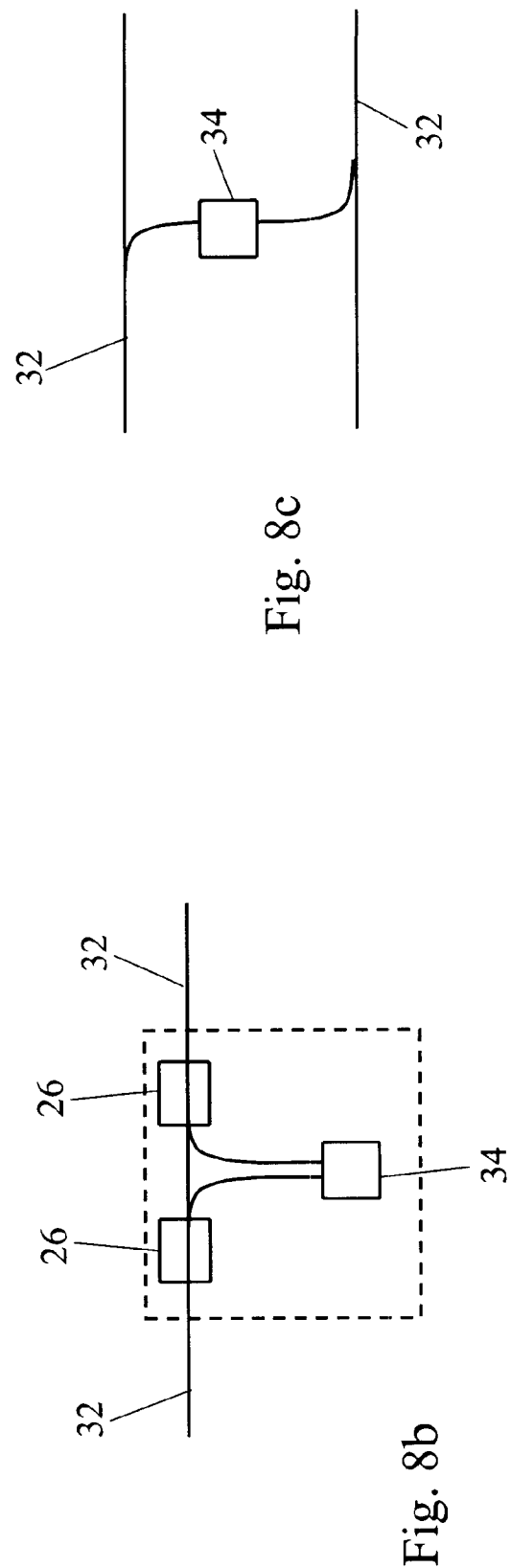
Figure 10:
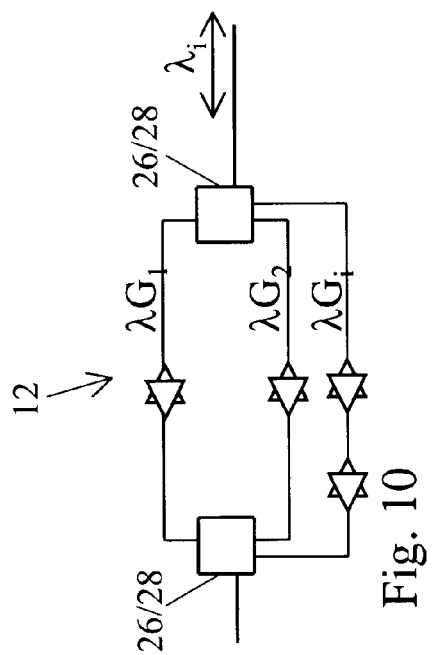

The optical amplifiers 12 generally include at least one optical amplifying medium supplied with power from an amplifier power source. For convenience, the optical amplifier 12 will be generally described in terms of an amplifying fiber 32 supplied with power in the form of optical energy, or "pump power", from one or more pump sources 34, as shown in FIGS. 7–9. It will be appreciated that optical amplifiers 12 including other amplifying media, i.e., semiconductor, etc., and power supplies may be substituted with appropriate modification.

The amplifying fiber 32 will generally be a doped and/or Raman fiber supplied with optical energy in one or more pump wavelengths $\lambda_{pi}$ suitable for amplifying the signal wavelengths $\lambda_i$ passing through the amplifying fiber 32. Raman and doped amplifier embodiments such as those described in commonly assigned U.S. patent application Ser. Nos. 09/119,556 and 09/253,811 can be used in the present invention and are incorporated herein by reference.

The doped and Raman amplifying fibers 32 can be distributed as part of the transmission fiber 14, and/or concentrated/lumped at discrete amplifier sites, and can be locally or remotely pumped with optical energy. For example, FIGS. 7–9 show amplifier 12 embodiments, which include both distributed and concentrated amplifier stages (FIG. 7), only distributed amplifier stages (FIG. 8), and only concentrated amplifier stages (FIG. 9). As shown in FIGS. 7–9, pump power can be supplied from pump sources 34 to the amplifying fiber in one or both directions.

The amplifying fiber 32 can have the same or different transmission and amplification characteristics than the transmission fiber 14. For example, dispersion compensating fiber, dispersion shifted fibers, standard single mode fiber and other fiber types can be intermixed as or with the transmission fiber 14 depending upon the system configuration. Thus, the amplifying fiber 32 can serve multiple purposes in the optical system, such as performing dispersion compensation and providing different levels of amplification of the signal wavelengths $\lambda_i$.

The optical amplifier 12 can include one or more stages of the same or different designs. For example, concentrated and/or distributed Raman fiber amplifiers can be configured to provide serial amplification of the wavelength groups in one or more stages. The Raman pump sources 34 can be configured to provide partly interdependent or independent gain to each of the wavelength groups depending upon the spacing of the signal wavelengths in the system 10.

The amplifying fiber 32 can also include one or more dopants, such as Er, other rare earth elements, as well as other dopants that can be used in various compositions to provide the amplifying medium. For example, a C-band erbium amplifier can be used to provide optical amplification of its wavelength range and a different doped fiber or a Raman amplifier could be used to provide gain in distinct or overlapping wavelength ranges.

The pump power can be introduced into the transmission fiber 14 using various combiners 26. For example, passive, WDM, and/or dichroic couplers and/or circulators 30 in combination with Bragg gratings can be used to introduce the pump power into the amplifying fiber 32.

Pump power can be supplied to the amplifying fiber 32, either counter-propagating and/or co-propagating with respect to the propagation of the signal wavelengths $\lambda_i$, as shown in FIGS. 7–9. It will be appreciated that in a bi-directional amplifier $12_B$, the pump wavelength $\lambda_{pi}$ will be counter-propagating relative to signal wavelengths $\lambda_i$ in one direction as well as co-propagating relative to signal wavelengths $\lambda_i$ in the other direction.

The pump source 34 can include one or more narrow or broad band, coherent and incoherent, polarized or depolarized optical sources supplying pump power in one or more pump wavelengths $\lambda_{pi}$. The optical sources can be bandwidth controlled and stabilized using Bragg gratings or other wavelength selective reflective elements, as well as polarization controlled using polarization maintaining fiber or other devices.

The optical sources used to provide pump power can be selected to have sufficient power to offset the loss of pump power supplied by other sources that partly contributes to the gain in the wavelength group. In the event of an optical source failure, the optical amplifier 12 can adjust the power supplied by the remaining sources to compensate for the failed source.

Furthermore, it is generally desirable to provide for on-line pump source 34 replacement to allow the link 15 to continue to carry traffic, while an optical source or one of the pump source 34 is being replaced. Various on-line pump replacement techniques can be employed in the present invention. For example, see commonly assigned U.S. patent application Ser. No. 09/310,324, which is incorporated herein by reference.

Gain partitioning can be produced in the optical amplifier in a number of methods, such as varying the amplifying media and/or the power supply. For example, gain partitioning in Raman amplifiers can be produced by the proper selection of pump wavelengths $\lambda_{pi}$ used to produce gain in the amplifying fiber 32 for a signal wavelength range. The pump source 34 can include a plurality of optical sources, such as diode or fiber lasers, operating at different pump wavelengths that provide Raman gain to distinct signal wavelength ranges. Thus, the failure of an optical source supplying pump power in to amplify one wavelength group will not affect, or only partly affect the other wavelength groups.

The optical amplifier 12 can be implemented, for example, as a distributed Raman amplifier supplied with pump power in a plurality of pump wavelengths corresponding to a signal wavelength range in the system 10. For example, pump power can be supplied using optical sources, such as DFB diode or fiber lasers having various bandwidths and pump wavelengths centered at approximately 1420, 1440, 1460, and 1480 nm to provide Raman gain to signal wavelengths $\lambda_1$ in the range of 1520–1565 nm. The pump power can be supplied locally or remotely in either, or both, counter- or co-propagating directions with respect to uni- or bi-directionally propagating signal wavelengths $\lambda_i$. Additional pump wavelengths could be included to expand the signal wavelength range in either or both the shorter or longer wavelength ranges. For example, the signal wavelength range could be expanded to 1510–1620 nm by providing pump power in the 1400 and 1500 nm wavelength ranges. It will be appreciated that the precise center wavelengths of the pump wavelengths can be varied in order to achieve various gain profiles and signal wavelength group allocations. The pump spacing also depends upon the number of pump sources available for use, the pump power and bandwidth in each source and the manner in which the pump power is combined and inserted into the amplifier.

The signal wavelength range in the example could be divided into four wavelength groups corresponding to the pump wavelengths of the exemplary optical amplifier. Each pump wavelength can be used to provide Raman gain substantially to a corresponding wavelength group in the signal wavelength range and contribute to a lesser extent to the Raman gain in other wavelength groups. The first and third wavelength groups and the second and fourth wavelength groups could be paired and contain corresponding working and protection channels.

The preceding signal wavelength range could also be divided into only two wavelength groups. Working signal wavelengths in the shorter wavelength range could be protected using protection wavelengths in the longer wavelength range and vice versa. In these exemplary configurations, the wavelength groups will most likely have partly interdependent gain given the closeness of the wavelength spacing.

Alternatively, an entire wavelength transmission window of the fiber, e.g., 1550 nm, could be defined as one wavelength group containing working or protection channels. A second signal wavelength group in a different wavelength transmission window, i.e., 1300, 1400, 1600 nm ranges, etc. of the optical fiber could carry the complementary working or protection channels. These configurations could provide wavelength groups with independent gain between the working and protection channels.

Optical fiber manufacturers are continually developing new types of optical fiber that expand or modify the transmission windows in the optical fiber. For example, some of the newer fibers have substantially decreased the loss in the 1400 nm range between the 1300 and 1550 transmission windows. The present invention is equally applicable to the evolving transmission characteristics of newly developed fiber types. Thus, the wavelength spacing between the working and protection channels and the fiber type will dictate whether independent or partly interdependent gain occurs in the optical amplifiers 12.

In operation, the optical system 10 including the optical amplifiers 12 can be configured to transmit both a working channel $\lambda_{wo}$ and one or more protection channels $\lambda_{pc}$ on the same fiber 14. Protection channels and the corresponding working channel are transmitted in different wavelength groups. The working channels $\lambda_{wc}$ can be grouped together into one or more working wavelength groups $\lambda G_w$, which can be amplified independently or partly interdependently from the protection channels $\lambda_{pc}$ included in one or more protection wavelength groups $\lambda G_p$. Alternatively, the working channels can be interspersed in the same wavelength groups with protection channels for other working channels.

The protection scheme of the present invention can be implemented using various channel protection schemes. For example, information can be transmitted in a single fiber 14 through the optical system 10 using the first wavelength $\lambda_1$ as the working channel $\lambda_{wc}$ and at least the second wavelength $\lambda_2$ as the protection channel $\lambda_{pc}$. The information can be transmitted simultaneously using one or more protection channels to provide a single fiber 1+N type protection. Similarly, the information can be switched from the first wavelength $\lambda_1$ to the second wavelength $\lambda_2$ upon a failure to provide single fiber M:N type protection. Likewise, the protection scheme can be implemented in combination with various path protection schemes, such as UPSR, BLSR, and more general mesh path protection schemes, to reduce the number of failure modes that require protection switching to a different fiber.

In the present invention, protection switching from the working wavelength, or channel, $\lambda_{wc}$ to the protection wavelength, or channel, $\lambda_{pc}$ on the same fiber can be performed using the various metrics, known in the art. For example, the loss of an optical source in one of the pump sources 34 can result in a protection switch to the protection channel. Likewise, the detection of increased error rates on a working channel wavelength $\lambda_{wc}$ signal can provide a basis for switching to the protection channel wavelength signal $\lambda_{pc}$. A delay can also be introduced into the protection channel to allow for "hitless" switching to the protection path, as well as other signal processing.

The protection schemes of the present invention provide increased reliability over prior art systems. The optical amplifiers are configured to operate essentially as different virtual amplifiers, which provides the increased reliability. Analogous to completely different amplifiers, the failure of a pump in one virtual amplifier does not shutdown a second virtual amplifier of the present invention. Similar to two different amplifiers, the pump source failure would result only in the loss of an associated wavelength group and not in the loss of the entire link as in prior art systems. Thus, in embodiments such as in FIG. 5, a single fiber can be used to provide bi-directional signal transmission with protection that is comparable to multiple fiber, single path or cable, bi-directional systems.

Extreme failure modes, such as a fiber cut or complete loss of power to an amplifier site, have a similar probability of occurrence for either one fiber or multiple fibers in a single cable. Thus, present systems 10 provide comparable reliability when working and protection channels are transmitted on a single fiber using a plurality of virtual amplifiers relative multiple fibers within the same cable using physically separate amplifiers in prior art systems.

In fact, the present invention can alternatively be implemented using physically separate, parallel amplifiers. The optical amplifiers 12 can include demultiplexers to separate the signal wavelength groups $\lambda G$ into a plurality of parallel paths, which can then be independently amplified using physically separate uni- or bi-directional parallel amplifiers, and then recombined (FIGS. 10–13).

As is known, a shortcoming of parallel amplifier embodiments is the increased cost associated with providing two or more full amplifiers at each amplifier site in the transmission path. For example, see U.S. Pat. Nos. 4,886,334 and 5,392,154 and EP 0 883 218.

Figure 12:
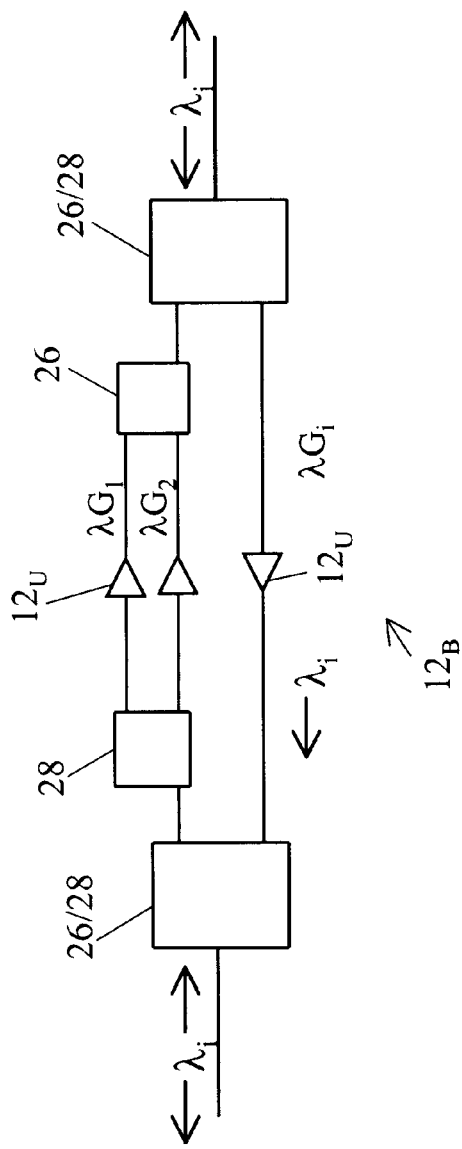

However, unlike prior implementations of parallel amplifier embodiments, the present invention can employ parallel amplifiers to provide for same fiber protection of the working capacity of the system 10. Each parallel amplifier can also include one or more serial amplifier stages, as well as additional parallel sub-stages. Furthermore, a combination of serial and parallel path amplifiers can be provided in the present invention (FIG. 12).

In parallel stage amplifier embodiments, distributors 28 are used to separate the signal wavelengths $\lambda_i$ in an optical signal into two or more wavelength groups $\lambda G$. Physically separate amplifiers, $12_U$ and/or $12_B$, independently amplify each wavelength group and combiners 26 recombine the wavelength groups to reform the optical signal.

Figure 11:
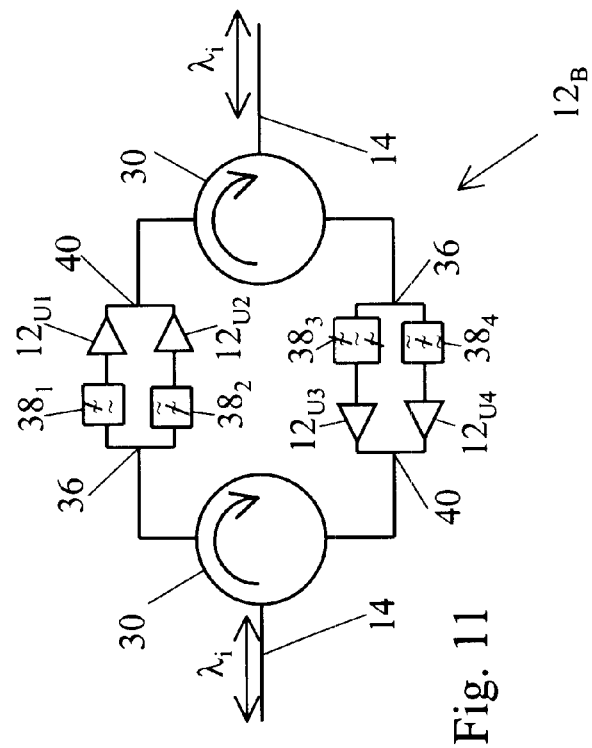

FIG. 11 shows a bi-directional amplifier $12_B$ embodiment, in which circulators 30 are used to provide the signal wavelengths $\lambda_i$ in each direction to uni-directional amplifier stages $12_U$. A passive splitter 36 can be used to split the optical signal into two signals and corresponding optical filters $38_{1-4}$ are configured to pass the desired wavelength groups $\lambda G$ to the respective optical amplifier stages $12_{U1-U4}$. The amplified signal wavelengths $\lambda_i$ can be recombined using passive couplers 40 to reform the optical signal, which can be reinserted onto the transmission fiber 14 using a second optical circulator 30.

Figure 13:
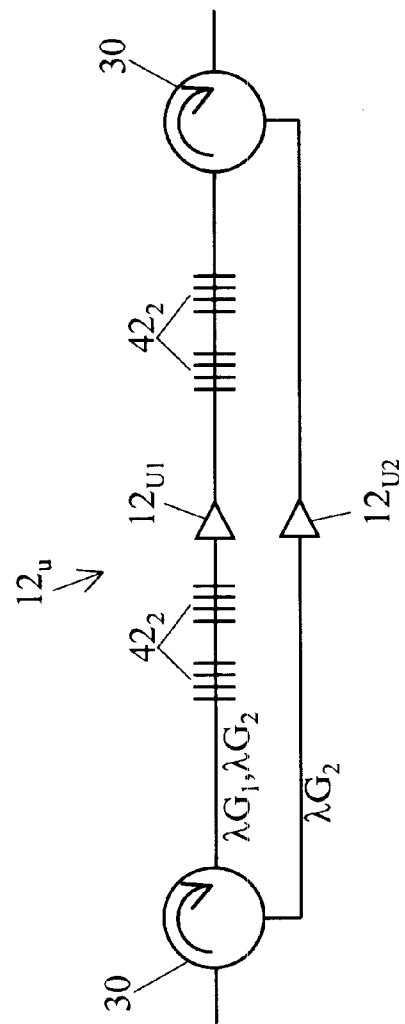

The passive splitter 36 and optical filter 38 embodiments used to separate the wavelength groups $\lambda G$ can be replaced by various demultiplexers to reduce the loss associated with the separation. For example, FIG. 13 shows optical amplifier 12 embodiments, in which circulators 30 are used in combination with Bragg gratings 42 to separate the wavelength groups. In FIG. 13, one or more Bragg gratings $42_2$ are used to separate the second wavelength group $\lambda G_2$ from the first wavelength group $\lambda G_j$. A second circulator 30 and set of Bragg gratings $42_2$ can be used to recombine the wavelengths, or other combiners 26, such as passive couplers 40, can also be used.

The optical amplifiers 12 can employ parallel amplifiers having the same or different construction. For example, C-band and L-band erbium doped fiber amplifiers, concentrated Raman fiber amplifiers having the same or different pump sources and/or various semiconductor amplifiers can be used in various parallel amplifier embodiments. Each parallel amplifier can then be optimized for particular signal wavelength groups passing through the amplifier, such as L-band & C-band amplifiers. While each parallel amplifier can amplify either, or both, working and protection channels, protection channels for a given working channel are amplified using different parallel amplifiers as with other embodiments.

Those of ordinary skill in the art will appreciate that numerous modifications and variations that can be made to specific aspects of the present invention without departing from the scope of the present invention. It is intended that the foregoing specification and the following claims cover such modifications and variations.

What is claimed is:

1. A method of transmitting information comprising:
   providing an optical amplifier configured to provide partitioned gain in a plurality of wavelength groups;
   transmitting information on a working wavelength within a first of the wavelength groups through the optical amplifier; and,
   provisioning at least one protection wavelength in at least a second of the wavelength groups to transmit the same information transmitted on the working wavelength through the optical amplifier.

2. The method of claim 1, wherein said provisioning includes transmitting the at least one protection wavelength at the same time as the information is transmitted in the working wavelength.

3. The method of claim 1, wherein said provisioning includes transmitting the at least one protection wavelength with a time delay relative to the information transmitted in the working wavelength.

4. The method of claim 2, wherein said transmitting includes transmitting information bi-directionally through the optical amplifier.

5. The method of claim 1, wherein said provisioning includes transmitting the same information transmitted on the working wavelength on the at least one protection wavelength, when the optical amplifier fails relative to the first wavelength group.

6. The method of claim 5, wherein said provisioning includes electrical switching the information from being transmitted on the working wavelength to being transmitted on the at least one protection wavelength.

7. An optical system comprising:
   a first node configured to transmit information on at least a first working wavelength and at least one corresponding first protection wavelength;
   a second node configured to receive the information on at least the first working wavelength and at least the corresponding first protection wavelength; and,
   at least one optical amplifier configured to provide partitioned gain of at least the first working and protection wavelengths being transmitted from said first node to said second node.

8. The system of claim 7, wherein:
   said first node transmits information via an optical fiber to said second node; and,
   said at least one optical amplifier is disposed along said optical fiber.

9. The system of claim 7, wherein said second node is configured to receive the first working and protection wavelengths and select one of the first working wavelength and the at least one first protection wavelength.

10. The system of claim 7, wherein said at least one optical amplifier includes a single stage amplifier configured to provide partitioned gain of the first working wavelength and the at least one first protection wavelength.

11. The system of claim 7, wherein said at least one optical amplifier includes a plurality of amplifier stages configured to provide partitioned gain of the first working wavelength and the at least one first protection wavelength.

12. The system of claim 11, wherein said plurality of amplifier stages are serially configured to provide partitioned gain of the first working wavelength and the at least one first protection wavelength.

13. The system of claim 7, wherein said at least one optical amplifier includes at least one of concentrated Raman fiber amplifiers, concentrated doped fiber amplifiers, distributed Raman fiber amplifiers, distributed doped fiber amplifiers, and semiconductor amplifiers.

14. The system of claim 13, wherein said at least one optical amplifier includes a Raman fiber amplifier supplied with pump power in a plurality of different pump wavelengths.

15. The system of claim 14, wherein said Raman fiber amplifier is supplied with pump power in pump wavelength that provide gain for the first working wavelength that is partly interdependent of the gain provided to the corresponding first protection wavelength.

16. The system of claim 15, wherein said Raman fiber amplifier includes a pump source configured to supply pump power to a Raman amplifying fiber in a first range of pump wavelengths to provide Raman gain at least substantially to a first wavelength group including the first working wavelength and in a second range of pump wavelengths to provide Raman gain at least substantially to a second wavelength group including the first protection wavelength.

17. The system of claim 16, wherein the first wavelength group and the second wavelength group include a signal wavelength range of 1520–1565 nm.

18. The system of claim 14, wherein said first working and protection wavelengths are transmitted in a transmission window for an optical fiber interconnecting said first and second nodes and said pump source is configured to supply pump power in pump wavelengths to provide Raman gain to the first working and protection wavelengths.

19. The system of claim 18, wherein said first working and protection wavelengths are transmitted in different transmission windows of said optical fiber.

20. The system of claim 18, wherein said different transmission windows include wavelengths in the 1300, 1400, 1550, and 1650 nm ranges.

21. The system of claim 11, wherein said optical amplifier includes:
   a demultiplexer configured to separate at least the first working wavelength into a first parallel path and at least the first protection wavelength into a second parallel path;
   a first parallel amplifier in the first parallel path configured to provide gain to at least the first working wavelength and a second parallel amplifier in the second parallel path configured to provide gain to at least the first protection wavelength; and,
   a combiner configured to combine wavelengths from the first and second parallel paths.

22. The system of claim 21, wherein said first and second parallel amplifiers include at least one erbium doped fiber amplifier configured to provide gain to corresponding first and second wavelength groups.

23. The system of claim 7, wherein:
   said second node is further configured to transmit information in a second working wavelength and at least one second protection wavelength;
   said first node is further configured to receive the information in the second working wavelength and the at least one second protection wavelength; and,
   said at least one optical amplifier configured to provide partitioned gain of the first and second working wavelengths and the at least one first and second protection wavelengths being transmitted between said first node to said second node.

24. The system of claim 23, wherein said first and second working wavelengths are transmitted bi-directionally on a single optical fiber.

25. The system of claim 24, wherein said first and second channels wavelengths are transmitted bi-directionally on the same optical fiber as the first and second working wavelengths.

26. A method of transmitting information comprising:
   providing first and second nodes configured to transmit and receive information on working and protection wavelengths via an optical fiber;
   configuring an optical amplifier disposed along the optical fiber configured to provide partitioned gain in a plurality of wavelength groups;
   transmitting information in a working wavelength within a first of the wavelength groups through the optical amplifier; and,
   provisioning at least one protection wavelength in at least a second of wavelength groups to carry the same information carried by the working wavelength through the optical amplifier.

* * * * *